April 18, 1933. G. BAUER ET AL 1,904,606
HYDRAULIC POWER TRANSMITTER
Filed June 18, 1930 2 Sheets-Sheet 1
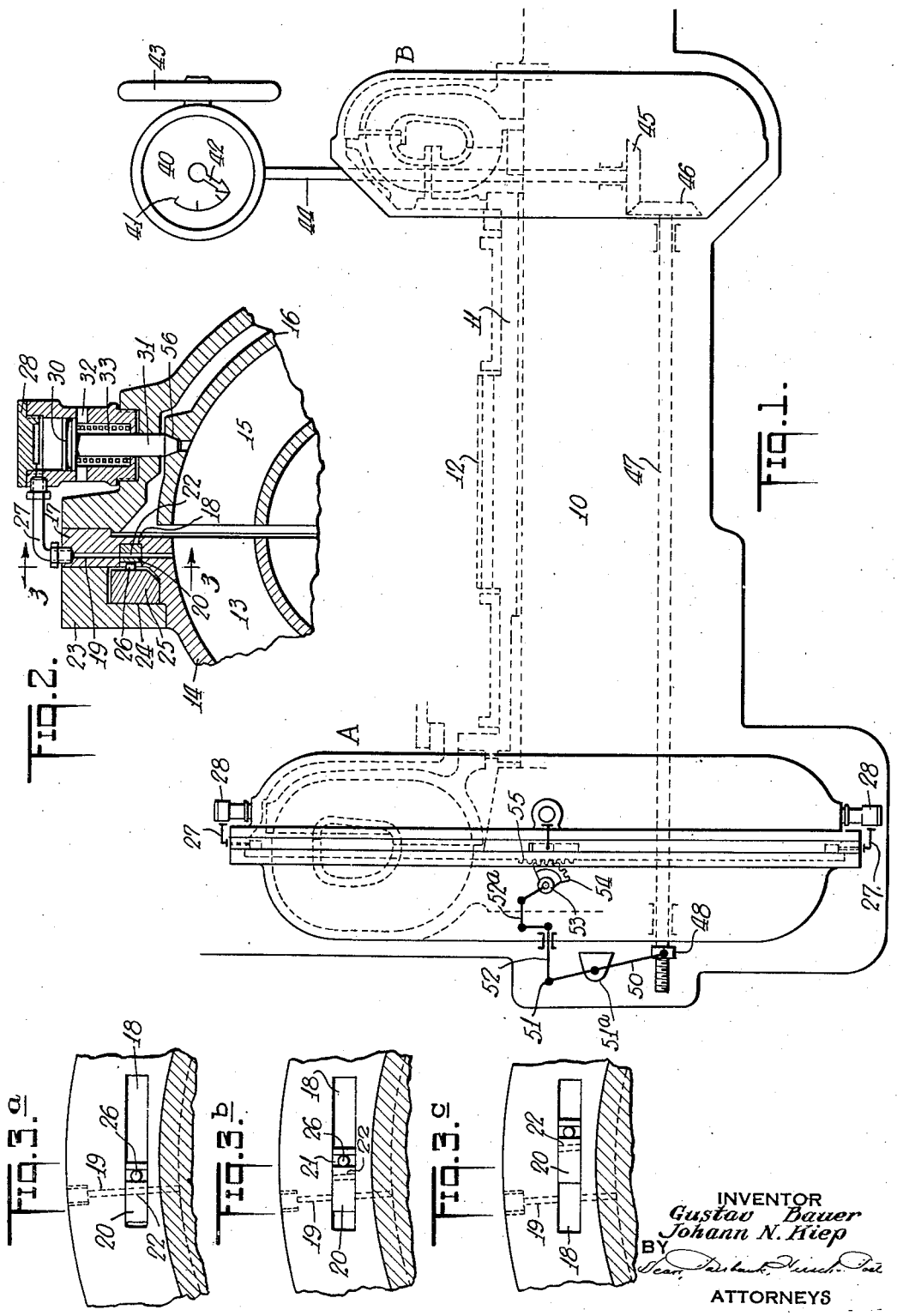
INVENTOR
Gustav Bauer
Johann N. Hiep
BY
ATTORNEYS April 18, 1933.  G. BAUER ET AL  1,904,606
HYDRAULIC POWER TRANSMITTER
Filed June 18, 1930  2 Sheets-Sheet 2
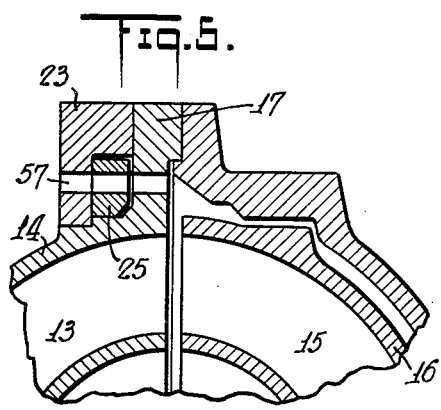
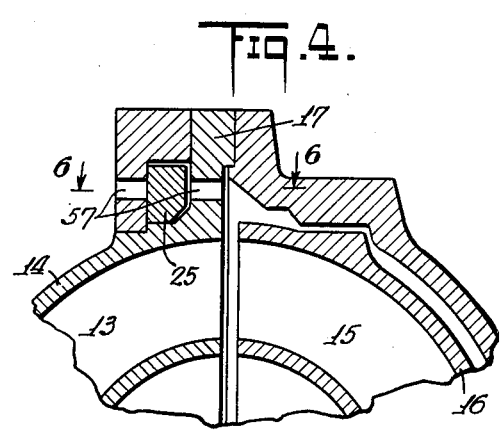
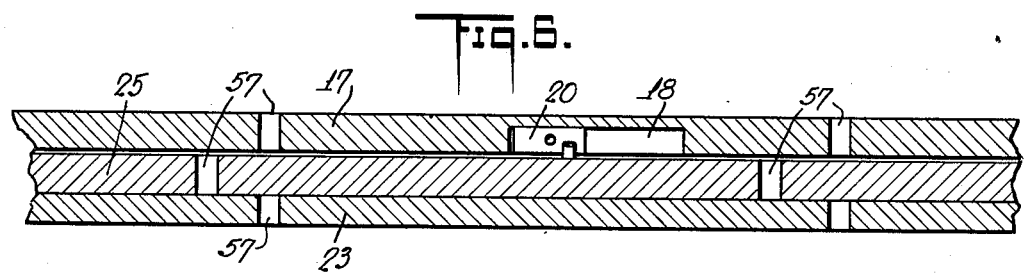
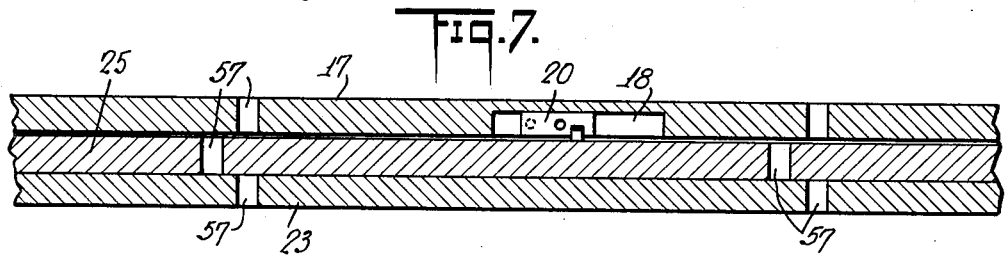
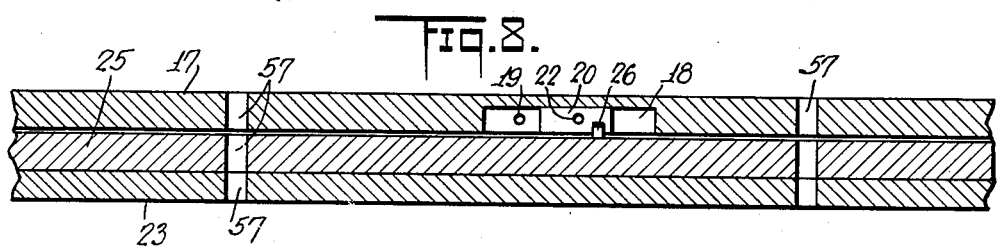
INVENTOR
Gustav Bauer
Johann N. Kiep
BY
ATTORNEYS Patented Apr. 18, 1933

1,904,606

UNITED STATES PATENT OFFICE

GUSTAV BAUER, OF HAMBURG, AND JOHANN NIKOLAUS KIEP, OF ALTONA-HOCHKAMP, GERMANY

HYDRAULIC POWER TRANSMITTER

Application filed June 18, 1930, Serial No. 461,933, and in Germany October 15, 1928.

This invention relates to that type of hydraulic power transmitter or fluid clutch in which a primary and a secondary rotor are each provided with an annular series of vanes, blades or passages so designed and so juxtaposed that the liquid in said passages causes the rotation of the secondary rotor upon rotation of the primary rotor. A construction of that type is shown and broadly claimed in the Föttinger Patent No. 1,199,359.

Where power transmitters of this type are used for the connection of driving and driven shafts, it has been possible to secure an efficiency of power transmission of approximately 97% if the parts be properly designed and proportioned in accordance with predetermined speed and load conditions. The loss of approximately 3% is due to slippage between the primary and secondary rotors of the power transmitter. In many cases, this loss is fully compensated for by the fact that the hydraulic power transmitter prevents the transmission of tortional variations or oscillations such as those inherent in the operation of an ordinary reciprocating engine.

In some constructions, the torsional variations are negligible or of minor importance when operating at the standard operating speed for which the transmitter was designed. In such installations, for instance, in marine work the transmitter has served its main function when it has taken care of the variations occurring in bringing the speed of the driven member up to the desired operating speed. Where the vibrations or oscillations are comparatively small at the standard operating speed, it is important that the highest efficiency be secured which means the saving of the 3% slippage in the coupling. This can be accomplished by effecting a rigid connection between the driving and driven member. The effecting of such rigid connections is also important in some installations where under emergency conditions the efficiency, regardless of transmission of torque variations is important.

One object of the present invention is to permit of the securing of the usual advantages of the hydraulic power transmitter, namely, damping of oscillations and also to secure the efficiency of the rigid connection when operating conditions make it desirable.

The present invention accordingly provides means whereby a primary and secondary mover are initially connected by hydraulic means, and a rigid coupling may, if desired, be put into operation only after the hydraulic connection has been effected and the driven member has acquired a predetermined speed.

The present invention also provides means whereby the primary and secondary rotors of a transmission system are mechanically engaged without material jar or shock while operating under hydraulic connection.

In carrying out the invention, clutch members are employed of a type which will positively interlock so as to prevent slipping and which do not rely for their action on mere frictional engagement such as is the case if a friction clutch be used.

The clutch members are preferably in the form of a plurality of evenly spaced bolts or locking pins at the periphery of one of the hydraulic members and adapted to engage in corresponding openings in the other hydraulic member.

As a further feature of the invention, the engagement of these locking members is hydraulically effected by the pressure of the liquid in the hydraulic coupling. Therefore, the locking member cannot be caused to engage when the coupling is at rest or when the liquid is withdrawn from the coupling or when the speed is below the limit required to give the pressure necessary to actuate the locking members.

As a further important feature, the action of the operating liquid of the transmitter on the locking means may be controlled at will so that positive locking together or unlocking of the hydraulic rotor members may be effected at such times or at such speeds above the low limit speed as the operator may desire. Couplings of the Föttinger type above referred to are often provided with a discharge control ring at the periphery which may be actuated relatively to one of the rotors to open or close liquid discharge ports for preventing or permitting the filling of the coupling with the operating liquid to stop or start the transmission of power from the constantly rotating primary rotor to the secondary or driven rotor. As a further feature of the present invention, the flow of the operating fluid from the transmitter or coupling to the locking member is also controlled by a movement of this control ring whereby the ring may be moved to one position to close the discharge parts of the coupling and permit filling for starting power transmission and may then be given a second movement which will permit flow of the fluid to the locking members. Although positive locking members are preferable, it will be apparent the broad invention involved in the double use of the control ring is not dependent on the use of locking bolts or mechanical interlocking parts as other forms of mechanical hydraulically actuated clutches might be employed and controlled by the movement of the discharge control ring.

So far as concerns the use of these specific locking members shown, the fluid might be delivered thereto from any suitable source.

The invention also consists in certain new and important features of construction and combinations of parts hereinafter set forth and claimed.

Although the novel features which are believed to be characteristic of this invention will be particularly pointed out in the appended claims hereto, the invention itself, as to its objects and advantages, the mode of its operation, and the manner of its organization, may be better understood by referring to the following description taken in connection with the accompanying drawings forming a part thereof, in which Fig. 1 is a side elevation of one embodiment of the present invention.

Fig. 2 is a section showing the positive clutch system and certain details of the means controlling the same.

Figs. 3a, 3b and 3c, are sections taken on line 3—3 of Fig. 2, and showing the valve which controls the operation of the positive clutch means disposed in different positions.

Figs. 4 and 5 are sections with the elements in the position of Fig. 3a (or 3b) and Fig. 3c, respectively, and showing the parts for effecting the charge or discharge of the fluid operating circuit.

Figs. 6, 7 and 8 are sections taken along the line 6—6 of Fig. 4 and showing the position of the valves corresponding to the position shown in Figs. 3a, 3b and 3c, respectively.

Like reference characters denote like parts in the several figures of the drawings.

In the following description and in the claims parts will be identified by specific names for convenience, but they are intended to be as generic in this application to similar parts as the art will permit.

In the accompanying drawing there is shown one exemplification of the present invention comprising a forward drive hydraulic coupling A and a reverse drive hydraulic coupling B the primary rotors thereof being secured to a primary shaft 10 which is driven by any suitable source of power (not shown). The secondary rotor of the two couplings are secured to a sleeve or hollow shaft 11 which has mounted thereon a gear 12 for transmitting the power to any suitable device. The driving rotor of the coupling A includes a series of vanes or blades 13 confined in a casing 14 rotatable therewith. Within the casing 14 and co-operating with the driving rotor is the driven rotor including a series of vanes or blades 15 confined in a casing 16. In this Föttinger type of hydraulic coupling the driven rotor is rotated in response to the kinetic energy of the fluid impelled from the blades 13 against the blades 15.

The casing 14 has an annular flange 17 which is provided with a plurality of grooves 18 and ducts 19. Mounted for slidable movement in groove 18 is a valve 20 which is provided with a slot 21 as well as a duct 22 which latter may be brought into and out of registry with the corresponding duct 19. Disposed adjacent the annular flange 17 is a member 23 which is mounted rigid with the casing 14, and is provided with an annular groove 24 for the reception therein of an annular discharge control ring 25. This ring 25 is provided at spaced points thereon with pins 26 which extend into the slot 21 of the corresponding valves 20 to effect slidable movement of the valve along the groove 18 in response to the relative rotational displacement of said ring 25 with respect to the casing 14.

Each duct 19 is connected at the outer end thereof with a connection 27 which leads into a cylinder 28. Mounted in this cylinder for reciprocal movement is a piston 30 having secured thereto a radially extending coupling bolt or pin 31, the end of which is tapered. This cylinder 28 is provided with one or more ports 32, the purpose of which will be made manifest hereinafter. A portion of this cylinder 28 is reduced in diameter, and disposed in this reduced portion is a compression spring 33 which co-operates with the piston 30 and serves to urge it towards the head of said cylinder.

In order to effect the selective relative displacement of the ring 25 with respect to the casing 14, any suitable control means is provided. As shown this comprises a dial 40 having a plurality of indications 41 thereon, and a pointer 42 mounted for indicative co-operation with said indications. The pointer 42 is rotated in response to the manipulation of a hand wheel 43 which also serves to rotate a shaft 44, the lower end of which has mounted thereon a bevel gear 45. This bevel gear 45 meshes with a bevel gear 46 carried at one end of a horizontal shaft 47, the other end of which has a threaded engagement with a collar 48. Pivotally connected to said collar 48 is one end of a lever 50, the other end of which is connected by a joint 51 to a horizontally reciprocatory rod 52. This lever 50 is pivoted intermediate of its ends on a fixed bracket 51a. The rod 52 has an arm rigid therewith and the end of this arm is connected by a link 52a to a lever arm secured to a shaft 53. The shaft also carries a segmental gear 54 which engages gear teeth 55 formed on or secured to this control ring 25.

In the operation of this machine, when it is desired to initiate the rotation of the driven rotor, the hand wheel 43 is manipulated so that the pointer 42 registers with the indication corresponding to the establishment of a hydraulic connection. In this position of the pointer, the valve 20 will be in a position indicated in Fig. 3b wherein the fluid passage from the operating circuit of the system to the cylinder will be blocked. Under these conditions, the primary and secondary rotors will be only connected hydraulically.

When it is desired to switch from a hydraulic connection to a positive rigid connection, the hand wheel 43 is manipulated so that the pointer 42 registers with the indication corresponding to a positive engagement. Under these conditions, the valve 20 will thus be moved into the position indicated in Fig. 3a wherein the duct 22 will be in register with the duct 19 so that the fluid from the operating circuit will find its way through said ducts and into the cylinder 28. The pressure of this fluid will be high enough to compress the spring and the piston 30 and its associated bolt 31 will move so that the end of each bolt will engage in one of the bores 56 provided in the casing 16. It should be noted that a slight relative displacement takes place between the primary and secondary rotor during hydraulic transmission so that the process of rigid coupling is easily effected. In the instant case with four coupling bolts as shown there would be at most a relative displacement of one quarter of the periphery after the shift of the valve 18 before the rigid coupling is effected.

When it is desired to return to hydraulic connection between the primary and secondary rotors, the hand-wheel 43 is manipulated so that each valve 20 will be restored to the position shown in Fig. 3b. The fluid trapped in the cylinder 28 will then escape along the periphery of its associated piston 30 and find its way through the ports 32. The bolts 31 will then return to their normal position under the action of the spring 33 and thereby disengage the rigid coupling connection. The driven rotors can then be driven solely by the driving liquid in the coupling.

If it is desired to suspend the operation of the driven rotor, the hand-wheel 43 is manipulated so that the valve 20 is in a position similar to the position indicated in Fig. 3c. Under these conditions the fluid in each cylinder 28 will escape through the connection 27 and into the groove 18 thereby effecting more instantaneous withdrawal of the bolt 31. This withdrawal of the coupling bolt pins 31, however, is sufficiently slow to obviate shocks or jars. The impelling fluid from the operating circuit can escape through the ports 57 formed in the ring 25 and the casing within which said ring slides.

Many of the features embodied in the present construction may be substantially the same as those disclosed in Patent 1,757,827.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

Having thus described our invention, what we claim as new and desire to secure by Letters Patent is:

1. A power transmitter including a primary rotor, a secondary rotor, a ring rotatably associated with said primary rotor, means for effecting the relative displacement of said ring with respect to said primary rotor, a radially extending coupling pin mounted for rotational movement with said primary rotor, a casing mounted for rotational movement with said secondary rotor and having a bore in the outer periphery thereof, means for hydraulically connecting said rotors, and means actuated in response to the fluid pressure in said last mentioned means and operable in accordance with the relative rotational position of said ring with respect to said primary rotor for effecting the engagement of said coupling pin with the bore of said casing.

2. A hydraulic power transmitter of the Föttinger type including driving and driven rotors, a discharge control ring carried by one of said rotors for permitting or preventing escape of liquid therefrom, a locking member for preventing relative rotation of said rotors, and hydraulic means controlled by said ring for actuating said locking member.

3. A hydraulic power transmitter of the Föttinger type including driving and driven rotors, a discharge control ring carried by one of said rotors for permitting or preventing escape of liquid therefrom, an annular series of radially movable locking members for preventing relative rotation of said rotors, and hydraulic means controlled by said ring for actuating said locking members.

4. A hydraulic power transmitter of the Föttinger type including driving and driven rotors, a discharge control ring carried by one of said rotors for permitting or preventing escape of liquid therefrom, an annular series of radially movable locking members for preventing relative rotation of said rotors, and means controlled by said ring for actuating said locking members.

5. A hydraulic transmitter of the kinetic type, including a primary rotor, a secondary rotor, a coupling pin carried by the primary rotor adjacent to the periphery thereof and movable in a radial direction into or out of interlocking engagement with the secondary rotor, and manually controllable means for applying the fluid pressure in the operating circuit of the transmitter for moving said pin radially into locking position.

6. A power transmitter of the kinetic type, including a driving rotor, a driven rotor, a control member carried by said driving rotor adjacent to the periphery thereof and having limited relative movement in respect to said rotor, a locking member for connecting said driving rotor and said driven rotor to prevent relative rotation, and means controlled by said control member for permitting discharge of liquid from the operating circuit of said transmitter, and means also controlled by said control member for effecting actuation of said locking member.

7. A power transmitter of the Föttinger type, including a driving rotor, a driven rotor, an annular ring encircling said driving rotor and having limited relative rotational movement in respect thereto, and a member for interlocking said rotors to prevent relative rotation, said annular ring operating in one position to permit discharge of liquid from the operating circuit of said transmitter, and in a second position operating to control the actuation of said member by said liquid.

8. A hydraulic power transmitter of the kinetic type, including a driving rotor, a driven rotor, a locking member for connecting said rotors and preventing relative rotation, a piston for operating said member, and a manually controllable device carried by the driving rotor on the periphery thereof for permitting discharge of liquid from the operating circuit of the transmitter and for controlling delivery of said liquid from said circuit to said piston.

9. A power transmitter of the kinetic type, including a driving rotor, a driven rotor, a movable member carried by one of said rotors for engaging the other rotor and locking said rotors against relative rotation, and a three position control member carried by one of said rotors and serving in one position to prevent discharge of liquid from the operating circuit of the transmitter, in a second position to permit free discharge of said liquid from said circuit, and in a third position to effect operation of said movable member.

10. A power transmitter of the kinetic type, including a driving rotor, a driven rotor, a radially movable pin carried by said driving rotor at the periphery thereof and adapted to interlock with said driven rotor to prevent relative rotation of said rotors, a spring for moving said pin to disengaged position, a piston connected to said pin, and controllable means for delivering liquid from the operating circuit of the transmitter to said piston to effect engagement of said pin.

Signed at Bremen, Germany, this 26th day of May 1930.

GUSTAV BAUER.
JOHANN NIKOLAUS KIEP.